US007814102B2

(12) United States Patent
Miller

(10) Patent No.: US 7,814,102 B2
(45) Date of Patent: Oct. 12, 2010

(54) METHOD AND SYSTEM FOR LINKING DOCUMENTS WITH MULTIPLE TOPICS TO RELATED DOCUMENTS

(75) Inventor: David James Miller, Dayton, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 331 days.

(21) Appl. No.: 11/295,531

(22) Filed: Dec. 7, 2005

(65) Prior Publication Data

US 2007/0130100 A1 Jun. 7, 2007

(51) Int. Cl.
G06F 17/30 (2006.01)
(52) U.S. Cl. ..................................................... 707/736
(58) Field of Classification Search ................ 707/1, 707/999.001, 999.002, 999.003
See application file for complete search history.

(56) References Cited

U.S. PATENT DOCUMENTS

| | | | | |
|---|---|---|---|---|
| 5,771,378 A * | 6/1998 | Holt et al. ....................... 707/5 |
| 5,819,260 A | 10/1998 | Lu et al. |
| 5,926,811 A | 7/1999 | Miller et al. |
| 6,122,647 A * | 9/2000 | Horowitz et al. ............. 715/205 |
| 6,138,129 A * | 10/2000 | Combs ........................... 707/6 |
| 6,154,213 A * | 11/2000 | Rennison et al. ............. 715/854 |
| 6,370,551 B1 * | 4/2002 | Golovchinsky et al. ...... 715/234 |
| 6,772,139 B1 * | 8/2004 | Smith, III ....................... 707/3 |
| 7,043,489 B1 * | 5/2006 | Kelley .......................... 707/101 |
| 7,054,858 B2 * | 5/2006 | Sutherland ........................ 1/1 |
| 7,065,514 B2 * | 6/2006 | Yang-Stephens et al. ........ 707/2 |
| 7,272,594 B1 * | 9/2007 | Lynch et al. .................... 707/3 |
| 7,275,061 B1 * | 9/2007 | Kon et al. ..................... 707/102 |
| 7,308,643 B1 * | 12/2007 | Zhu et al. ..................... 715/206 |
| 7,412,463 B2 * | 8/2008 | Mitchell et al. .................... 1/1 |
| 7,447,713 B1 * | 11/2008 | Berkheimer ................. 707/204 |
| 7,451,135 B2 * | 11/2008 | Goldman et al. ................... 1/1 |
| 7,509,306 B2 * | 3/2009 | Boettiger ........................... 1/1 |
| 2001/0037347 A1 * | 11/2001 | Kelliher et al. ............... 707/530 |
| 2003/0074345 A1 * | 4/2003 | Baldwin et al. .................. 707/1 |
| 2003/0195888 A1 * | 10/2003 | Croft et al. .................... 707/10 |
| 2003/0204500 A1 * | 10/2003 | Delpech ......................... 707/3 |
| 2004/0015785 A1 * | 1/2004 | Lin .............................. 715/530 |
| 2005/0027685 A1 * | 2/2005 | Kamvar et al. .................. 707/2 |
| 2005/0065909 A1 * | 3/2005 | Musgrove et al. .............. 707/2 |
| 2005/0119824 A1 * | 6/2005 | Rasmussen et al. ........... 701/200 |
| 2005/0203899 A1 * | 9/2005 | Anderson et al. ............... 707/5 |
| 2005/0222976 A1 * | 10/2005 | Pfleger .......................... 707/3 |
| 2005/0289446 A1 * | 12/2005 | Moncsko et al. ............. 715/501.1 |
| 2006/0041607 A1 | 2/2006 | Miller et al. |
| 2006/0041608 A1 | 2/2006 | Miller et al. |
| 2006/0047639 A1 * | 3/2006 | King et al. ....................... 707/3 |

(Continued)

*Primary Examiner*—Charles Rones
*Assistant Examiner*—Phuong-Thao Cao
(74) *Attorney, Agent, or Firm*—Dinsmore & Shohl LLP

(57) ABSTRACT

A method and system for linking documents with multiple topics to related documents employs two distinct processes: a fabrication process to pre-establish candidate target document links within a case law or other document for discrete topics, for example, points of law and landmark cases, that represent related documents that are relevant to one or more headnotes within the case law document; and an on-line process to analyze the search request, the candidate links, and available landmark cases during a retrieval of a document to dynamically select the candidate target document links that are relevant to the point of law of interest to a searcher who retrieved the case law document via a search request.

25 Claims, 10 Drawing Sheets

U.S. PATENT DOCUMENTS

| | | | |
|---|---|---|---|
| 2006/0184915 A1* | 8/2006 | DeGroote et al. | 717/106 |
| 2006/0248440 A1* | 11/2006 | Rhoads et al. | 715/500 |
| 2007/0033531 A1* | 2/2007 | Marsh | 715/738 |
| 2007/0050344 A1* | 3/2007 | Rind et al. | 707/3 |
| 2007/0088751 A1* | 4/2007 | DeFelice et al. | 707/104.1 |
| 2008/0010311 A1* | 1/2008 | Kon et al. | 707/102 |
| 2008/0097833 A1* | 4/2008 | Bharat | 705/10 |
| 2009/0024610 A1* | 1/2009 | Liu et al. | 707/5 |

* cited by examiner

```
<lnvxe:suggcontentlk relevancescore="75" materialtype="treatises"
materialpriority="1">
    <lnvxe:suggcontenthn hnnum="13"/>
    <lnvxe:suggcontentcoreterms>
        <lnvxe:ct>actionable</lnvxe:ct>
        <lnvxe:ct>defamation</lnvxe:ct>
        <lnvxe:ct>defamatory</lnvxe:ct>
        <lnvxe:ct>malice</lnvxe:ct>
        <lnvxe:ct>falsity</lnvxe:ct>
        <lnvxe:ct>false</lnvxe:ct>
        <lnvxe:ct>defamatory statement</lnvxe:ct>
        <lnvxe:ct>allegedly defamatory statement</lnvxe:ct>
        <lnvxe:ct>reputation</lnvxe:ct>
        <lnvxe:ct>libel</lnvxe:ct>
        <lnvxe:ct>allegedly defamatory</lnvxe:ct>
        <lnvxe:ct>affirmative defense</lnvxe:ct>
        <lnvxe:ct>public figure</lnvxe:ct>
        <lnvxe:ct>common law</lnvxe:ct>
        <lnvxe:ct>identification</lnvxe:ct>
    </lnvxe:suggcontentcoreterms>
    <lnvxe:suggcontentrmlk rmtype="stat" rmkey="4-52 Texas Torts and
Remedies SEC 52.02">
        4-52 Texas Torts and Remedies § 52.02, Elements of Defamation
    </lnvxe:suggcontentrmlk>
</lnvxe:suggcontentlk>
```

LexisNexis® Total Research System

Switch Client | Preferences | Feedback | Live Support | Sign Off | Help
Dossier | History MyLexis™ | Search | Research Tasks | Search Advisor | Get a Document | Shepard's® | Alerts FOCUS™ Terms [reputational tort w/10 free speech] Search Within [All Documents] Go ↑ FOCUS Options...

View: Cite | KWIC | Full | Custom                                                                FAST Print... | Print | Download | Fax | Email | Text Only ◄ 1 of 3 NEXT ►

Save As Alert | More Like This | More Like Selected Text | Shepardize® | TOA

● Bentley v. Bunton, 94 S.W.3d 561 (Copy w/ Cite)                                          Pages: 84

Constitutional Law > Fundamental Freedoms > Freedom of Speech > Defamation
Constitutional Law > Fundamental Freedoms > Freedom of Speech > Scope of Freedom
HN2 ⬇ Unlike the United States Constitution, the Texas Constitution expressly guarantees the right to bring reputational torts. The Texas Constitution's free speech provision, Tex. Const. art. I, § 8, guarantees everyone the right to speak, write, or publish his opinions on any subject, being responsible for abuse of that privilege.  More Like This Headnote | Shepardize: Restrict By Headnote Constitutional Law > Fundamental Freedoms > Freedom of Speech > Scope of Freedom
HN3 ⬇ After thoroughly reviewing the history of Tex. Const. art. I, § 8, nothing in the language or purpose of the Texas Free Expression Clause authorizes the Texas Supreme Court to afford greater weight in the balancing of interests to free expression than it would under the First Amendment.  More Like This Headnote | Shepardize: Restrict By Headnote Constitutional Law > Fundamental Freedoms > Freedom of Speech > Defamation
Constitutional Law > Fundamental Freedoms > Freedom of Speech > Scope of Freedom
HN4 ⬇ In a defamation case and freedom of expression case, no rigid order of analysis is necessary, despite occasional language to the contrary in some opinions. Where the parties have not argued that differences in state and federal constitutional guarantees are material to the case, and none is apparent, the Texas Supreme Court limits its analysis to the First Amendment and simply assumes that its concerns are congruent with those of Tex. Const. art. I, § 8.  More Like This Headnote | Shepardize: Restrict By Headnote Constitutional Law > Fundamental Freedoms > Freedom of Speech > Defamation
Torts > Defamation & Invasion of Privacy > Defamation Actions ◄ Explore | Page [Select a Reporter] | Doc [1] GO of 3 ▶ | ◄ Term [ ] GO of 4 ▶

METHOD AND SYSTEM FOR LINKING DOCUMENTS WITH MULTIPLE TOPICS TO RELATED DOCUMENTS

FIELD OF THE INVENTION

The invention relates to the display of hypertext links within a document being viewed as the result of a text search request. The hypertext links must be relevant to both the document being displayed as well as the search request.

BACKGROUND OF THE INVENTION

U.S. Case Law documents discuss one or more points of law in a document. Often times, these points of law are not related to each other. A huge body of related documents exists that also discusses individual points of law, such as statutes, treatises, and law review articles.

Traditional research methods require the researcher to specifically search each type of document, or rely on specific references from within a case (to a statute, for example). Traditional document matching methods (known in various search systems as More Like This, Relevance Feedback, Clustering) typically use the entire document, rather than matching based on specific topics within the document. Even when the entire document primarily discusses a single topic, traditional hypertext links are static within a document, rather than being dynamically selected based upon the specific concepts being researched within the document as determined by the search request.

Creating links using terminology from a complete document that has multiple topics does not work well. Links for a specific topic are much more accurate. Even if all links exist in the document, static display of them makes it harder for the researcher to find the links of specific interest to them.

It is to the solution of these and other objects to which the present invention is directed.

BRIEF SUMMARY OF THE INVENTION

It is therefore a primary object of the present invention to present a legal researcher with additional documents, including landmark cases, that are highly relevant to the topic they are researching by linking them with case law.

It is another object of the present invention to present any researcher with hypertext links relevant to the topic of his or her search when viewing documents retrieved as a result of his or her search.

This invention can be applied to any document with multiple topics, so long as individual topics have been identified within the seed material.

This invention comprises two distinct processes: a fabrication process to pre-establish candidate target document links within a case law or other document for discrete topics, for example, points of law and landmark cases, wherein the target document links represent related documents that are relevant to one or more headnotes within the case law document; and an on-line process to analyze the search request, the candidate links, and available landmark cases during a retrieval of a document to dynamically select the candidate target document links that are relevant to the point of law of interest to a searcher who retrieved the case law document via a search request.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 5 is an example of a target document link, marked up using XML, suitable for storing within a seed document.

FIGS. 6A-6B collectively are an example of a case law document displayed with dynamically selected hypertext links based upon a search of "defamat! or libel! or slander! and fact w/5 opinion".

FIGS. 7A-7B collectively are an example of a case law document displayed with dynamically selected hypertext links based upon a search of "reputational tort w/10 free speech".

DETAILED DESCRIPTION OF THE INVENTION

Figure 1:
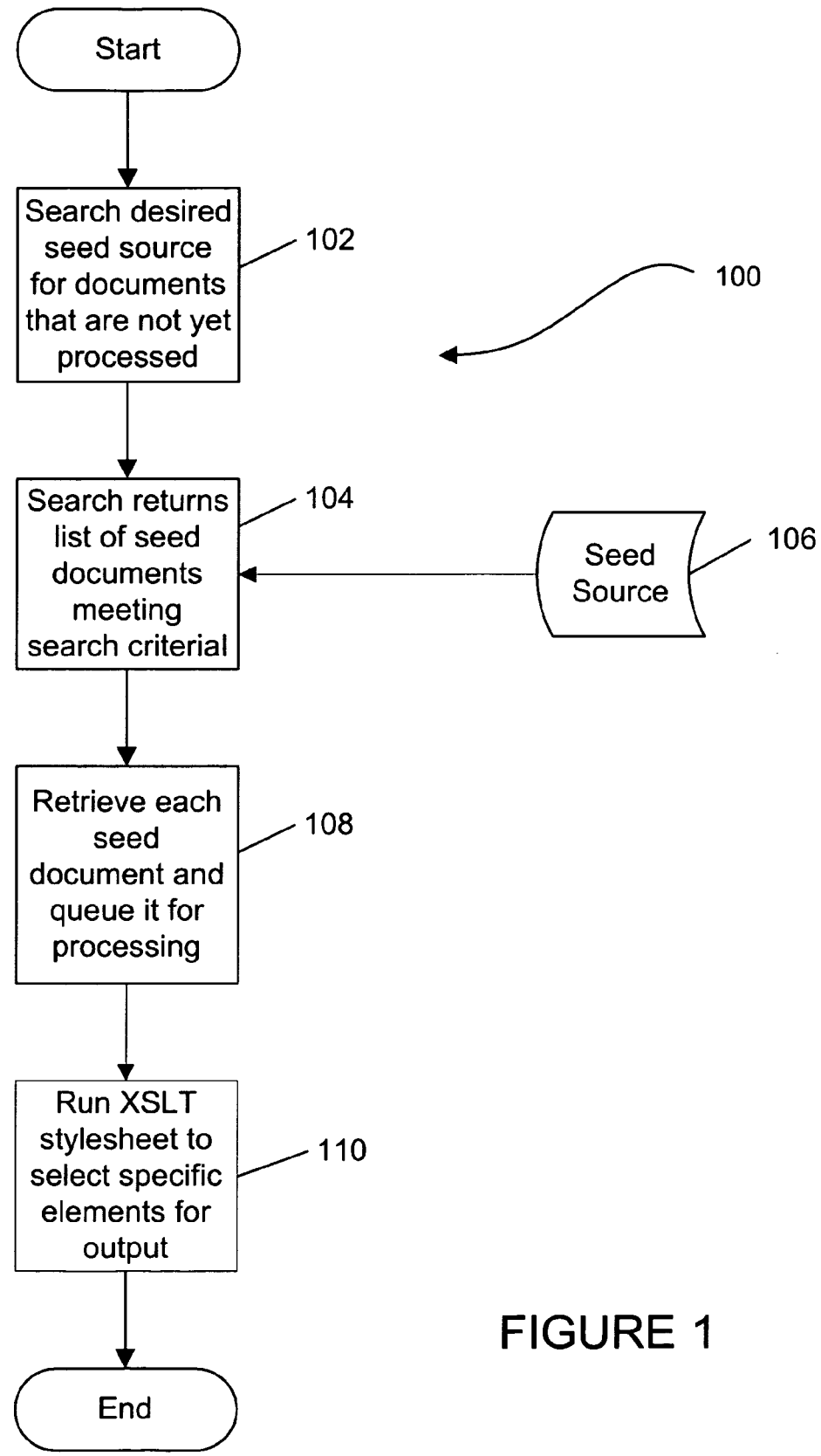
FIG. 1 illustrates the process for extracting seed documents from a collection.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Concept Definitions

The case law specific embodiment of this invention will display links to a variety of documents when a case law document is displayed. The documents must be relevant to both the case law document being displayed and the user's search request. The case law document being displayed as a result of a search request is called a seed document. This seed document contains one or more discussions of specific points of law, called seed topics, but lacks target document links (as defined below). Each of these seed topics is represented in a case law document as a headnote (and in a generic document generically as a topical abstract), and each headnote has one or more topical classifications assigned from a legal taxonomy (and in a generic context, from a subject matter taxonomy). These classifications are called seed topic classifications.

A seed source is a set of documents within a text retrieval system, containing seed topics.

A target source is a searchable source from which documents related to a search will be selected to become potential displayed links (hereafter referred to as target document links, defined below) in a collection of sources, such as case law. Target sources can be unrestricted, and therefore used for potential matches for all seed topics; or topically restricted and only used if the seed topic being matched has a seed topic classification equal to the target source topic restriction. Each seed document source has its own set of assigned target sources. For example, for Texas Supreme Court cases, target sources may include Texas Statutes and Code, Texas law reviews, and Mathew Bender's Dorsaneo Texas Litigation Guide. Also, if the seed topic being matched is on bankruptcy, the target source Collier on Bankruptcy could be included.

A target document is a document in a target source that discusses a topic also discussed in a headnote in a seed document. The target document will become the target of a link from the seed document.

A target source list for a seed document is a list of the target sources found in the Target Source Map (as defined below) for the jurisdiction of the seed document, which is the list of sources to search to generate the target document links.

Core terms are a set of words and phrases that represent the primary content of a document. Core terms are generated programmatically using a statistical algorithm, and are uncontrolled vocabulary (that is, core terms need not exist in a dictionary or taxonomy to be eligible to be a core term). In many types of documents, such as news articles and scientific articles, the author or publisher assigns a set of key terms to the document. Core terms are an automatically generated set of key terms. In information retrieval science terminology, the set of core terms for a document constitute a term vector that represents the context of the document within the vector space retrieval module. In engineering terminology, it is simply an array of up to 30 words or phrases that are important to the document in which they are found. The term vector may contain words and phrases (as described, for example, U.S. Pat. Nos. 5,819,260 and 5,926,811, which are incorporated herein by reference in their entireties).

A target document link retrieval is the retrieval of specific XML elements of a target document rather than the complete document. The XML elements to be retrieved may vary by source (DTD—Document Type Definition—in XML terminology). An XML element that contains the citation of the document must be returned. This citation must be suitable for linking to the document. One or more XML elements that contain text describing the document must also be returned. The XML element that contains the citation may be the same as the XML element or elements containing text describing the document. The purpose of these XML elements is to produce a text description of the link to this document from a seed document.

Metadata Definitions

A Target Source Map is metadata required to define the target sources for seed documents.

The metadata comprises target source records for each jurisdiction when the seed documents are case law. A target source record consists of the following data:

Seed Source—This is the name of the seed source to which this Target Source should be applied.

Target Source Selectable Name—This is the name used to select the target source within the search system. For example, in the Lexis™ Research System, the target source for Texas law reviews is composed of a library name of "TEXAS", and file name of "TXLRV".

Taxonomy Topic—"All" for sources that cover all seed topic classifications or a top-level classification from the taxonomy when this target source should only be applied to seed topics with a specific seed topic classification assignment. For example, the Collier source is only used if a headnote has a Bankruptcy classification from the taxonomy of a search feature such as the Lexis™ Research System Search Advisor, which allows users to access cases from a subject within a legal taxonomy for a selected jurisdiction. As used herein, "taxonomy" is a generic term for a classification system. The Lexis™ Research System Search Advisor is a legal taxonomy that is also hierarchical in structure.

Target Source Material Type—This is the type of publication of the target source. For example, when case law is the seed source, document types include statutes, treatises, and law reviews.

Target Source Business Priority—This is an indication of relative priority assigned to target sources. The lower the number assigned, the higher the perceived value of the target source. For example, some treatises may be given a higher priority than others due to their name recognition in the marketplace.

Case Law to Target Source Definition

In order to process U.S. case law, a target source map is created that has multiple entries for the different jurisdictions within the U.S. For example, each state and territory has its own set of target source mappings, as do federal circuit courts, district courts, and various other courts within the U.S.

Target Source Preparation

In order for a source, such as Mathew Bender's Dorsaneo Texas Litigation Guide, to be a target source, the source must have some basic definitions assigned to it. These definitions include the list of XML elements to retrieve for a target document link view (that is, a display of a target document link in response to a user request), the number of Core Terms to retrieve, and the XML element that specifies the citation for the document. The source must support a special target document link retrieval process. This retrieval process must produce the core terms for the source and retrieve specific data from the source. In addition to the term vector, the retrieval process must return a citation for any document retrieved from the target source that is sufficient to generate a hypertext link to that document, along with suitable text to display as a label for the hypertext link. In the Lexis™ Research System (which as well-know to those of skill in the art, is generally practiced within a client/server programming environment, in which one program, the client, makes a service request from another program, the server, which fulfills the request, and which is used in a network where computing functions and data are distributed among many client and server programs within different computers at different network locations: and wherein the computing functions and data are provided to a processor of a general purpose computer, special purpose computer, or other programmable data processing apparatus to produce a machine, such that the instructions that carry out the computing functions, which execute via the processor of the computer or other programmable data processing apparatus, create means for implementing the functions; and the computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the computing functions), a target document link view is defined in the data base definition for each target source. Since documents are stored in XML, the target document link view metadata, an example of which is shown in FIG. 5, contains a list of XML elements necessary for the retrieval process to process in order to generate the term vector for each document, an XML element name that contains the citation, and an ordered list of XML elements that contain the displayable text. The content of the listed XML elements is extracted and run through the Core Terms algorithm that generates the list of Core Terms. Not all XML elements with the document are useful for generating Core Terms, hence the selective list.

Extracting Seed Documents to Process

Referring now to FIG. 1, the fabrication process begins with a Seed Document process 100, which in turn begins at step 106 with a search in a seed source to find documents that have seed topics, but lack target document links. For example, the seed source may be Texas Supreme Courts, and for case law, seed topics are headnotes. Because the target document links are stored in their own XML element within the seed document, the search can be written to obtain documents with one type of XML element (the XML element for a seed topic) but not the other (the XML element for a target document link). Because the seed source is a set of documents within a text retrieval system, such as the Lexis™ Research System, the seed documents can be searched via various forms of syntax and natural language searches A Lexis™ Research System case law implementation could use the search request (step 102):

CORE-CONCEPTS(%has%terms%) and not SYS-CONTENTLINKS(%has%terms%)

in order to retrieve documents with headnotes—the case law form of a specific seed topic, and not already containing the fabricated target document links. Each document returned as a result of this seed document search (FIG. 1, step 104) is then retrieved via the standard retrieval mechanism for the text retrieval system (FIG. 1, step 108) (as used herein, "returning" of a document refers to a document reference only, and "retrieving" a document refers to a formatted document with document contents) and the seed topics for each, specific point of law are extracted by using an XSL engine to extract the XML elements specific to the seed topics (FIG. 1, step 110). The seed documents are then queued for processing of their seed topics by the target document link fabrication application.

The control of the Seed Document process 100 can be manual for an initial run in an existing source, or automated to search specific sources periodically, such as daily or weekly, in order to find new documents added since the initial run.

Processing Seed Documents

Figure 2:
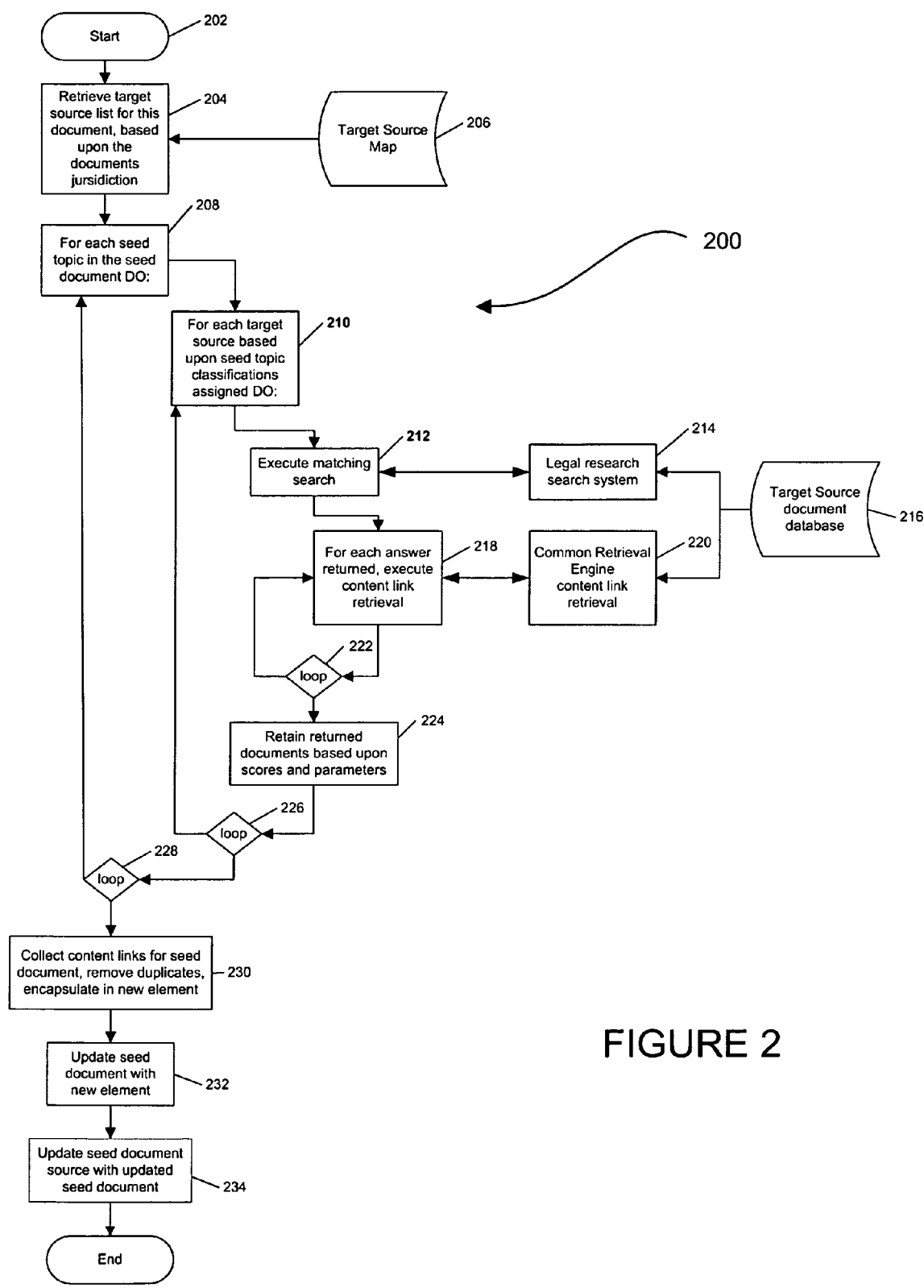
FIG. 2 illustrates the target document link fabrication process as applied to a single seed document.

Referring to FIG. 2, the fabrication application proceeds to a target document link fabrication process 200, which begins at step 202 and processes each retrieved seed document. The target document link fabrication process 200 first retrieves the target source list for the seed document (FIG. 2, step 204), based upon the source (for case law, the jurisdiction) of the seed document. The metadata in the Target Source Map for the source of the seed document can be maintained in a simple data structure, such as a file indexed by seed source, or a more complex structure such as a relational data base management system (FIG. 2, step 206).

Target Document Link Search

The target document link fabrication process 200 of the fabrication application loops to process each seed topic within the seed document (FIG. 2, steps 208 through 228). For each seed topic, the target document link fabrication process 200 processes each target source within the target source map for a document. The target source map has one or more entries for the seed source associated with each seed document. For each seed topic, the target document link fabrication process 200 processes each target source within the target source map for a document (FIG. 2, steps 210 through 226), if the target source matches the jurisdiction, unless the target source is topic restricted. For topic restricted sources, the target source is searched only if the target source matches the jurisdiction and if the seed topic has the same topical classification assigned from the taxonomy employed by the search system. More specifically, a special target document link search is constructed from the seed topic's XML element and run in each source specified in the target source list (FIG. 2, step 212). In the Lexis™ Research System case law implementation, this search uses the "More Like This Headnote" search technique, which is described in U.S. patent application publication No. 2006/0041607, published Feb. 23, 2006 (U.S. patent application Ser. No. 11/204,993, filed Aug. 17, 2005), titled "Point of Law Search System and Method" which is incorporated herein by reference in its entirety (FIG. 2, step 214). In the "More Like This headnote" search technique, the text of a headnote is handled as a search string, which undergoes a phrase recognition process (as described in U.S. Pat. Nos. 5,771,378 and 5,819,260, which are incorporated herein by reference) and optional application of a thesaurus, and which is then used to perform a natural language search. Other relevance ranking methods in text retrieval systems could be used. The search returns matching documents from the specified target source (FIG. 2, step 216).

Target Document Link Retrieval

The target document link fabrication process 200 of the fabrication application retrieves up to three highest ranked target documents returned by a target document link search (FIG. 2, steps 218 through 222). The application then performs a target document link retrieval using the target document link view for each target source document (FIG. 2, step 218), which in effect acts as a target document link retrieval request.

Figure 3:
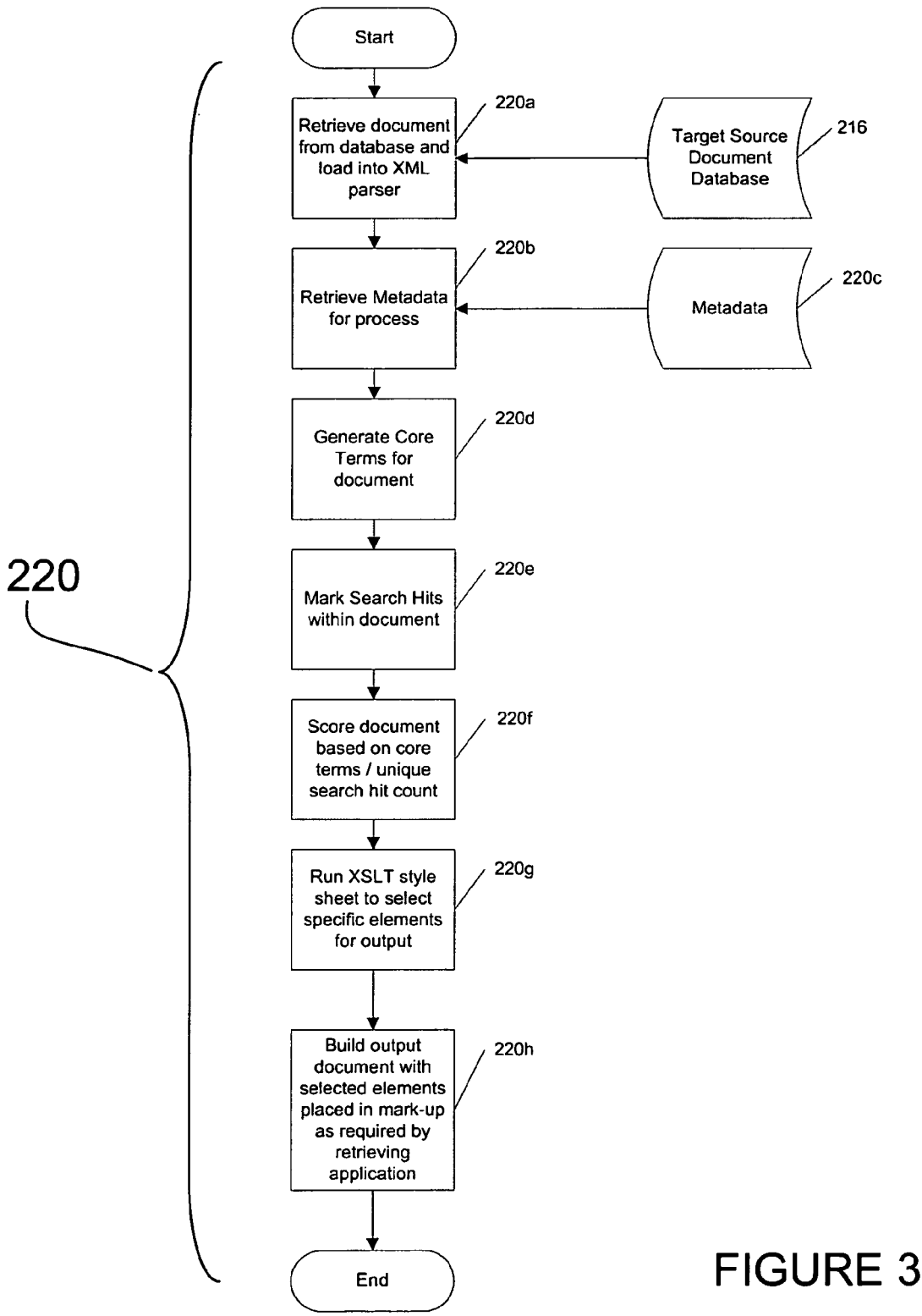
FIG. 3 illustrates the Common Retrieval Engine's retrieval flow for a target document link retrieval request.

More specifically, referring to FIGS. 2 and 3, the Common Retrieval Engine ("CRE"), a component within the Lexis™ Research System that is designed to retrieve and format XML documents, processes the target document link retrieval request (FIG. 2, step 220). The CRE retrieves the requested target document from the target source 216 (FIGS. 2 and 3) and loads the retrieved target source document into an XML parser (FIG. 3, step 220a). The metadata 220c (FIG. 3) is stored in a simple data set indexed by source and view (FIG. 3, step 220b). The CRE retrieves the metadata 220c for the retrieved target document based upon the target source name and the requested view of the target document link (FIG. 3, step 220b). Based upon the target document link view metadata, the CRE generates the core terms from the retrieved target document (FIG. 3, step 220d). Core terms represent the statistically most important terms (words and phrases) within the document. Other methods of representing the core content of a document could be used, such as author assigned index terms. The CRE locates and marks each search term found within the retrieved target document (FIG. 3, step 220e). The retrieval process then compares the search terms found within the retrieved target document with the core terms generated from the retrieved target document. A score is determined, which is equal to the number of unique search terms that are also core terms (FIG. 3, step 220f). The retrieval process generates an XML document containing all the data (that is, elements for link description, cite element, core terms) as defined within the target document link view as well as the score determined during the retrieval by applying an XSLT style sheet to select only the required XML elements within the retrieved target document (FIG. 3, step 220g) and place them in new XML elements as required by the retrieving application, which is the fabrication application (FIG. 3, step 220h).

Each search retrieves multiple target documents. The target document link fabrication process 200 of the fabrication application compares the scores returned for each retrieved target document to the score of all other retrieved target documents returned from the same search. It retains only those documents meeting a pre-determined score threshold, and only as many documents as specified in a separate configurable value. If tie scores occur, the document ranked higher by the initial search is considered the better document to retain (FIG. 2, step 224).

The target document link fabrication process 200 of the fabrication application runs multiple target document link searches for each seed document being processed. Each seed topic within the document is processed for every target source defined for that seed source and that specific seed topic based upon assigned seed topic classifications in the taxonomy. For example, for a Texas Supreme Court case, each headnote within the case is processed for each target source defined for Texas based on the specific Search Advisor topical classifications assigned to the headnote. The fabrication application collects all the retrieved target documents retained as a result of these target document link searches and target document link retrievals and generates a new XML element containing the target document links (FIG. 2, step 230). This new XML element is then added back into the original seed document (FIG. 2, step 232).

FIG. 5 shows an example of the XML for a target document link stored within a seed document (in other words, an example of the data returned for a Target Document Link View).

Determining Landmark Cases

For purposes of this application, a landmark case is defined as a case that is frequently cited by other cases for the same topic (in the generic context, a seminal document is a document that is frequently cited by other documents for the same topic). To find a landmark case, the user selects a topic within a taxonomy such as the Lexis™ Research System Search Advisor product legal taxonomy, and executes a Retrieve All search in the desired jurisdiction ("Retrieve All search" is used herein to refer to a search feature or features that allows users to retrieve cases relevant to a selected legal topic, such as a Lexis™ Research System Search Advisor topical classification, whether or not the cases contain a headnote with a topic label; users are able to isolate only the cases with a headnote on a topic from the initial Retrieve All answer set). This Retrieve All search returns all documents within the jurisdiction for that topic. The user then selects a sort option, such as the Lexis™ Research System computer-implemented Frequently Cited sort option, which resorts the answers based upon the number of cites to each answers from the other answers within the set. The most cited cases sort to the top. If a case is cited frequently, it is considered a landmark. Two factors are needed to determine if a case is cited frequently enough to call it a landmark, (1) a minimum absolute count and (2) a percentage count. For example, any case cited at least five times and by at least 10% of the case is a landmark, as is any case cited at least 20 times and by at least 5% of the cases. A more detailed description of the Frequently Cited sort option is provided in U.S. application Ser. No. 11/204,994, filed Aug. 17, 2005, titled "Landmark Case Identification System and Method."

Building a Table of Landmark Cases

Figure 8:
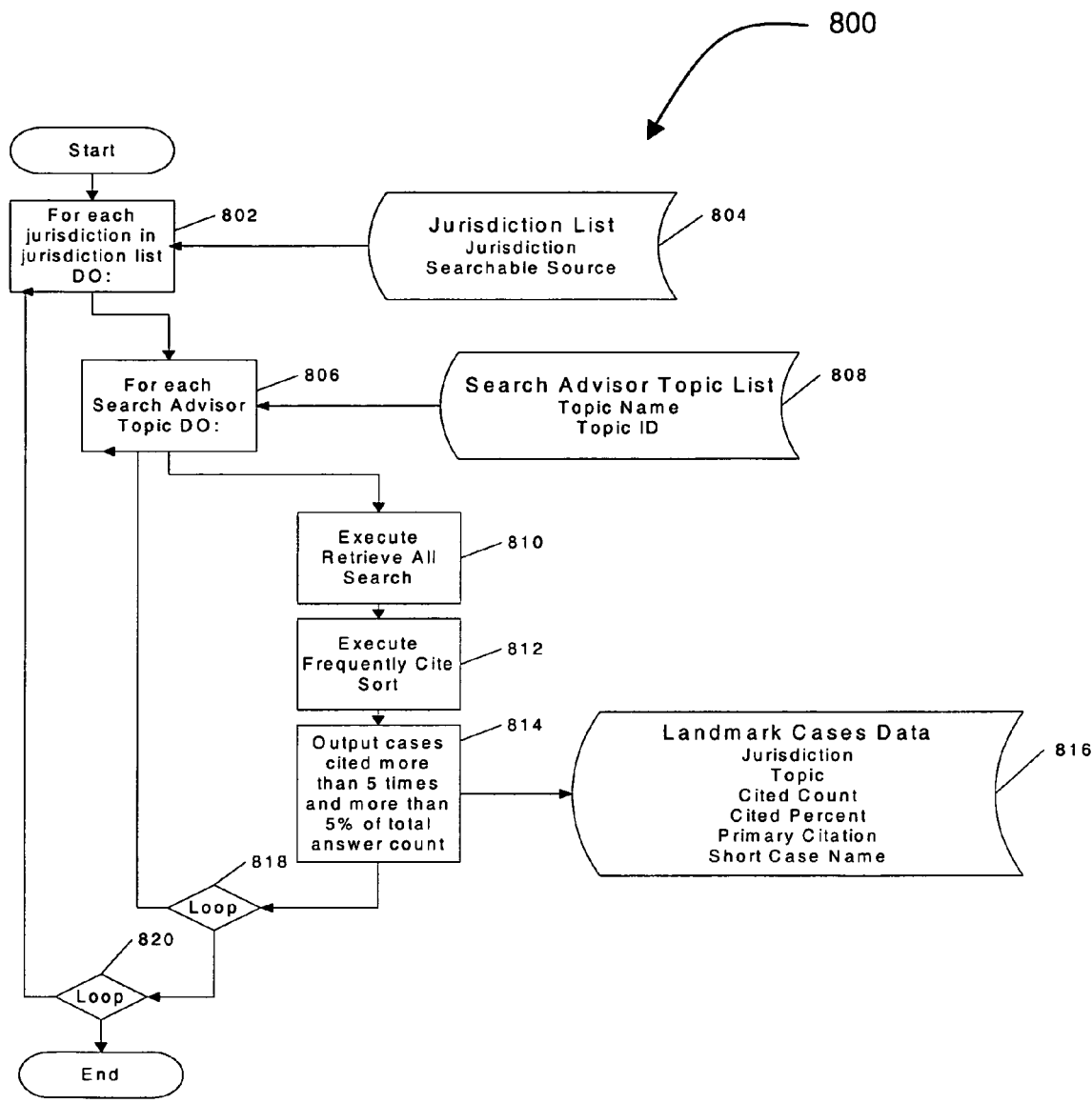
FIG. 8 illustrates the process of constructing a list of landmark cases for all supported jurisdictions.

Referring to FIG. 8, the fabrication application includes a landmark file build process 800 that creates a list of landmark cases by generating the landmark cases for all topical classifications within a taxonomy (for example, all Search Advisor topics) within a predefined set of jurisdictions. The build process 800 begins by reading a jurisdiction list (FIG. 8, step 802) that contains a search source for each jurisdiction to be processed (FIG. 8, step 804). For example, if the jurisdiction is Texas Supreme Court, the searchable source would be all state and federal courts with jurisdiction over Texas, which is the TEXAS library and TXMEGA file in the Lexis™ Research System. The Search Advisor legal taxonomy is accessed for a complete list of legal topics (FIG. 8, steps 806 and 808). The build process 800 runs the appropriate Retrieve All search (FIG. 8, step 810) in the selected source, followed by a Frequently Cited sort of the documents returned by the Retrieve All search (FIG. 8, step 812). The returned documents are then retrieved, and those meeting the predefined thresholds for being a landmark case are saved to a table (FIG. 8, step 818). The retrieval process 810 selects XML elements from the retrieved document that contain the short case name and primary legal citation, along with the cited frequency count from the sort. This data (that is, the short case name and primary legal citation, along with the cited frequency count) are all stored in the table (FIG. 8, steps 814 and 816), along with the jurisdiction and the cited percentage, which is determined by cited frequency and total number of documents classified within the topic for this jurisdiction, as determined by the number of documents returned by the Retrieve All search.

Build Process Input Parameters

In order to build the table of landmark cases, the build process 800 requires the following input:

1. Search Advisor topic file—a list of all Search Advisor defined topics within the Search Advisor legal taxonomy (FIG. 8, step 808).

2. Jurisdiction map—defines each jurisdiction for which landmark cases must be defined, and the selectable source to use when creating landmark cases for this jurisdiction. For example, in the Lexis™ Research System, an entry for Texas as the jurisdiction would have a selectable source of Federal and State Courts in Texas (FIG. 8, step 804).

3. Minimum Counts—the minimum absolute count and minimum percentage count, five (5) and five (5) respectively, required in order to include a case as a landmark in the landmark table (FIG. 8, step 814).

Flow

The build application 800 generates the data for the landmark table as described previously. Once this data is available, a file is created that contains the data in a format optimized for on-line retrieval. The build application 800 builds the file with multiple nested indices, and sorts and removes duplicate text strings (short case names and primary citations) in order to minimize the file size. The primary index into the file is the jurisdiction, represented by a unique ID assigned to each jurisdiction. For each jurisdiction, a secondary index exists for Search Advisor topical classifications that contain one or more landmark cases. For each landmark case, the cited frequency, cited percentage, and a pointer to the short case name and primary citation are kept.

Selecting Links for Display

The second process of this invention is designed to display hypertext links to target documents within a seed document when the document is retrieved as the result of a search request. The displayed links must be relevant to the seed document as well as the search request that caused the seed document to be retrieved.

Figure 4:
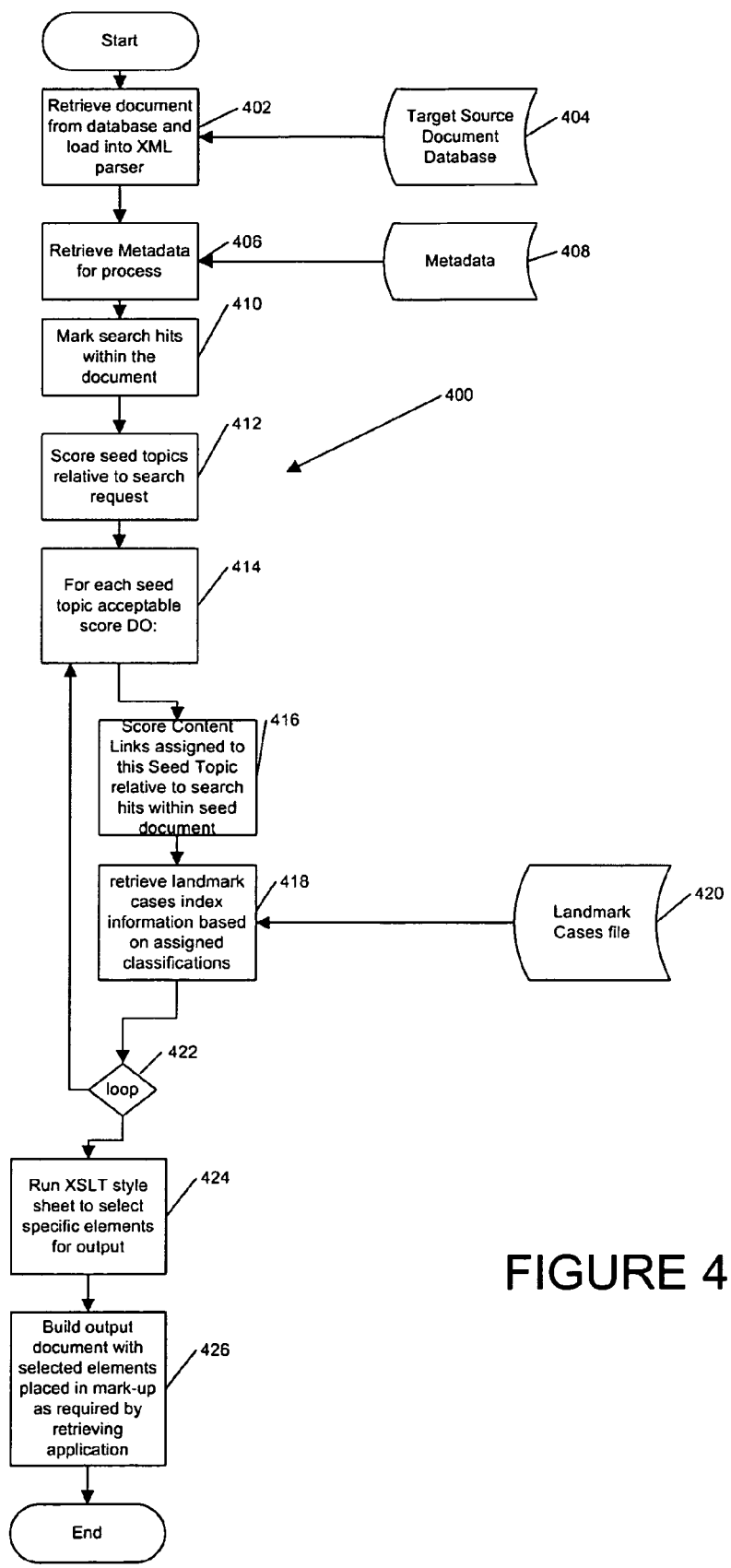
FIG. 4 illustrates the Common Retrieval Engine's retrieval flow for the retrieval of a seed document with fabricated target document links, as the result of a search request.

The first step in selecting which hypertext links to display is selecting the seed topics within the seed document that were relevant to the search request (FIG. 4, step 412). This selection is done by analyzing the search terms that occurred within the seed topics using traditional information retrieval techniques such as term frequency, search term coverage, and seed topic length. An example of such a technique for seed documents that are case law and seed topics that are headnotes is described in U.S. patent application Ser. No. 11/204,993 ("Point of Law Search System and Method."

Once one or more seed topics have been selected, the system must select target document links that have been fabricated for these seed topics (FIG. 4, step 414). When the seed document is case law and the seed topic a headnote, the jurisdiction for the case law document and the Search Advisor topical classifications for the selected headnotes are used to find landmark cases within the landmark case map (FIG. 4, step 418). The jurisdiction is used to search the primary index of the file with the map (FIG. 4 step 420), and the Search Advisor topical classifications of the selected headnote are used to search the secondary classification index. All landmark cases found are then considered for display. The system selects a preset maximum number of landmark cases for display based upon the cited frequency of the landmark cases (FIG. 4, step 424). The hypertext link is constructed using the primary citation from the landmark case map, and the primary citation and short case name are used as text to identify the hypertext link. (FIG. 4, step 424).

For each seed topic selected as relevant to the search that caused the seed document to be retrieved, the candidate links (that is, the selected target document links) fabricated into the document for the selected topics are scored (FIG. 4, step 414). The score is generated based upon the number of unique search terms within the document that are also core terms of the selected target document link (FIG. 4, step 416). A preset maximum number of candidate links to be displayed as target document links are selected based on each target source material type (FIG. 4, step 424). The selection is based upon the score assigned to the target document link and a business priority assigned to the target source as an indication of the target source's relative priority. For each target document link selected for display, a hypertext link is constructed using the citation and text previously stored in the XML element associated with the target document link in the XML document. (FIG. 4, step 424).

The final step in the display of the constructed hypertext links is the organization of the links for display within the context of the seed document display (FIG. 4, step 426). The hypertext links are organized by document type, along with landmark cases, and ordered within each material type by the assigned selection score and business priority. Each hypertext link to the target document also contains a reference—in the form of an intra-document link—to the seed topic within the document for which the target source document was selected. As an example, as shown in FIG. 6, when the seed documents are case law, a separate toolbox in the screen display, which contains headings for each material type and hypertext links within the headings, is displayed with the case law document. Headnote references are displayed that tie the hypertext link to the headnote that was the seed topic.

Detailed Case Law Example

The Case 2002 Tex. LEXIS 129, *Bentley v. Bunton*, is retrieved as a result of each of the following two searches:

(slander! or libel! Or defamat!) and fact w/5 opinion
reputational tort w/10 free speech When the system retrieves the Bentley case as a result of the slander search, headnote 13_(reference number 610 in FIG. 6B) is selected as a relevant seed topic due to it having two instances each of "defamation", "opinion", and "fact" and one instance of "libel" (Headnote 13 reads: "In a defamation action, if a speaker says, 'In my opinion John Jones is a liar,' he implies a knowledge of facts which lead to the conclusion that Jones told an untruth. Even if the speaker states the facts upon which he bases his opinion, if those facts are either incorrect or incomplete, or if his assessment of them is erroneous, the statement may still imply a false assertion of fact. Simply couching such statements in terms of opinion does not dispel those implications; and the statement, 'In my opinion Jones is a liar,' can cause as much damage to reputation as the statement, 'Jones is a liar.' It would be destructive of the law of libel if a writer could escape liability for accusations of defamatory conduct simply by using, explicitly or implicitly, the words 'I think.' At common law, even the privilege of fair comment did not extend to a false statement of fact, whether it was expressly stated or implied from an expression of opinion.").

When the system retrieves the *Bentley* case as a result of the reputational search, headnote 2 (reference number 710 in FIG. 7B) is selected as a relevant seed topic due to its having one instance each of "reputational tort" and "free speech" (Headnote 2 reads: "Unlike the United States Constitution, the Texas Constitution expressly guarantees the right to bring reputational torts. The Texas Constitution's free speech provision, Tex. Const. art. I, §8, guarantees everyone the right to speak, write, or publish his opinions on any subject, being responsible for abuse of that privilege.").

Figure 6A:
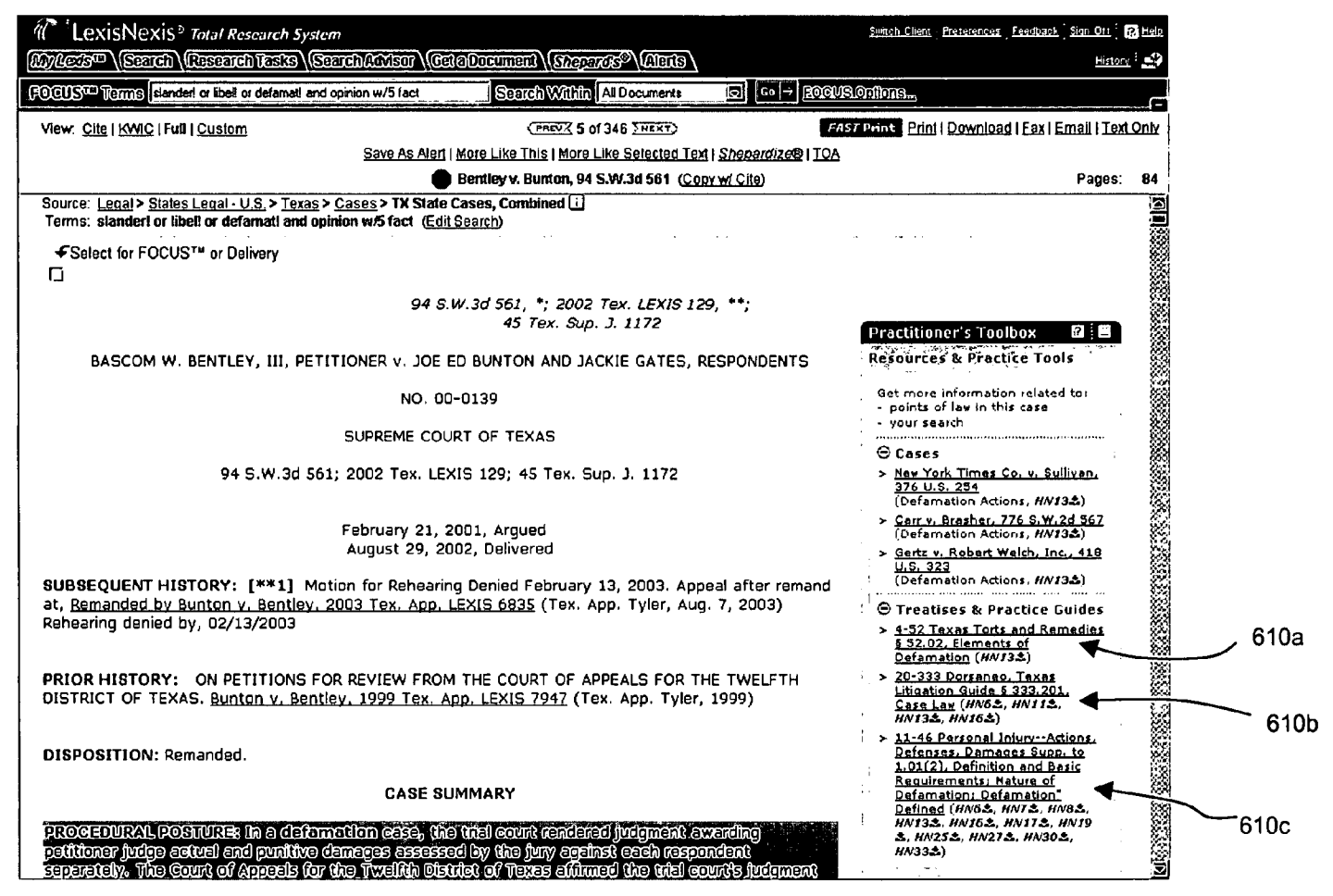
Figure 6B:
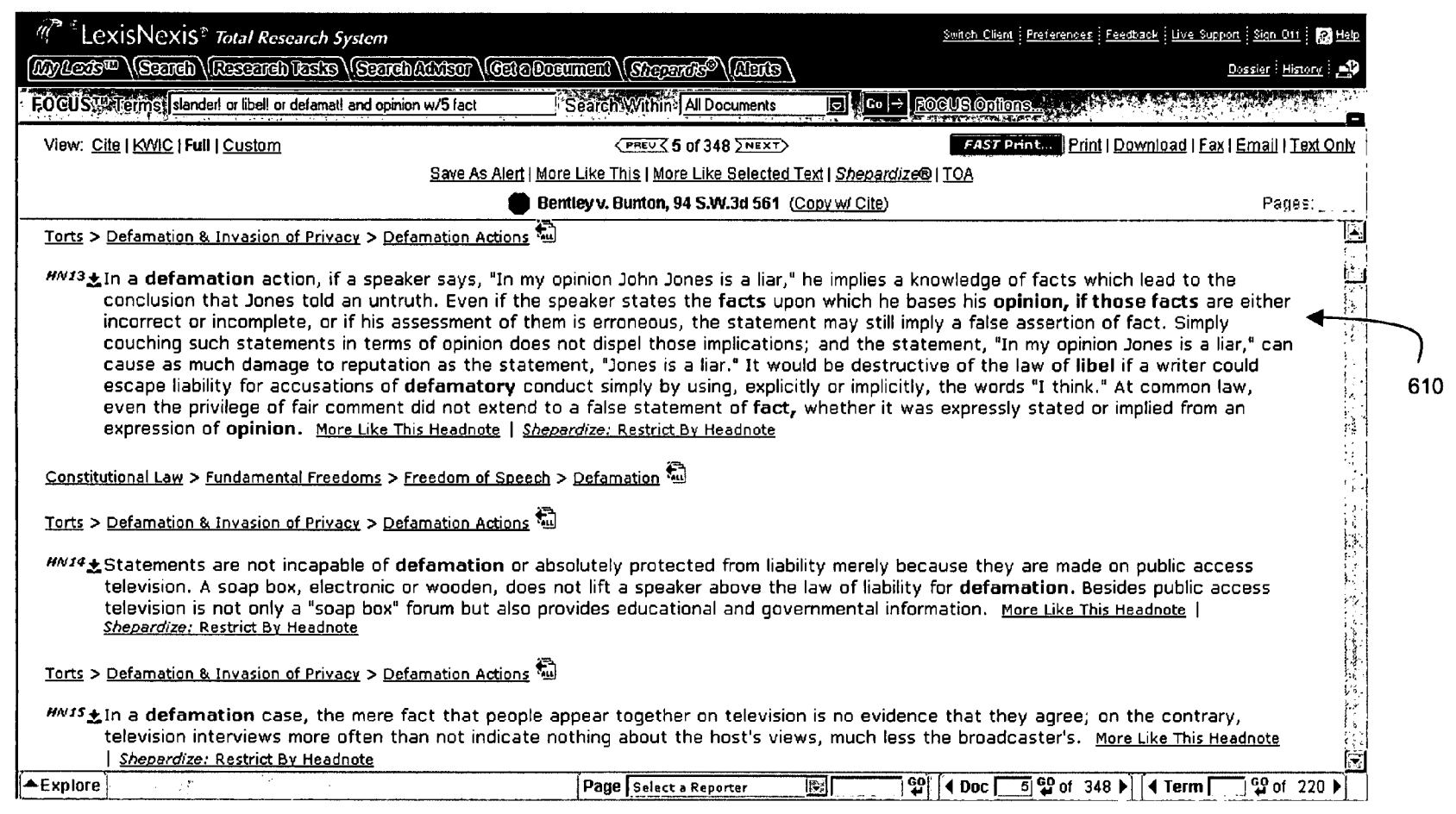
Figure 7A:
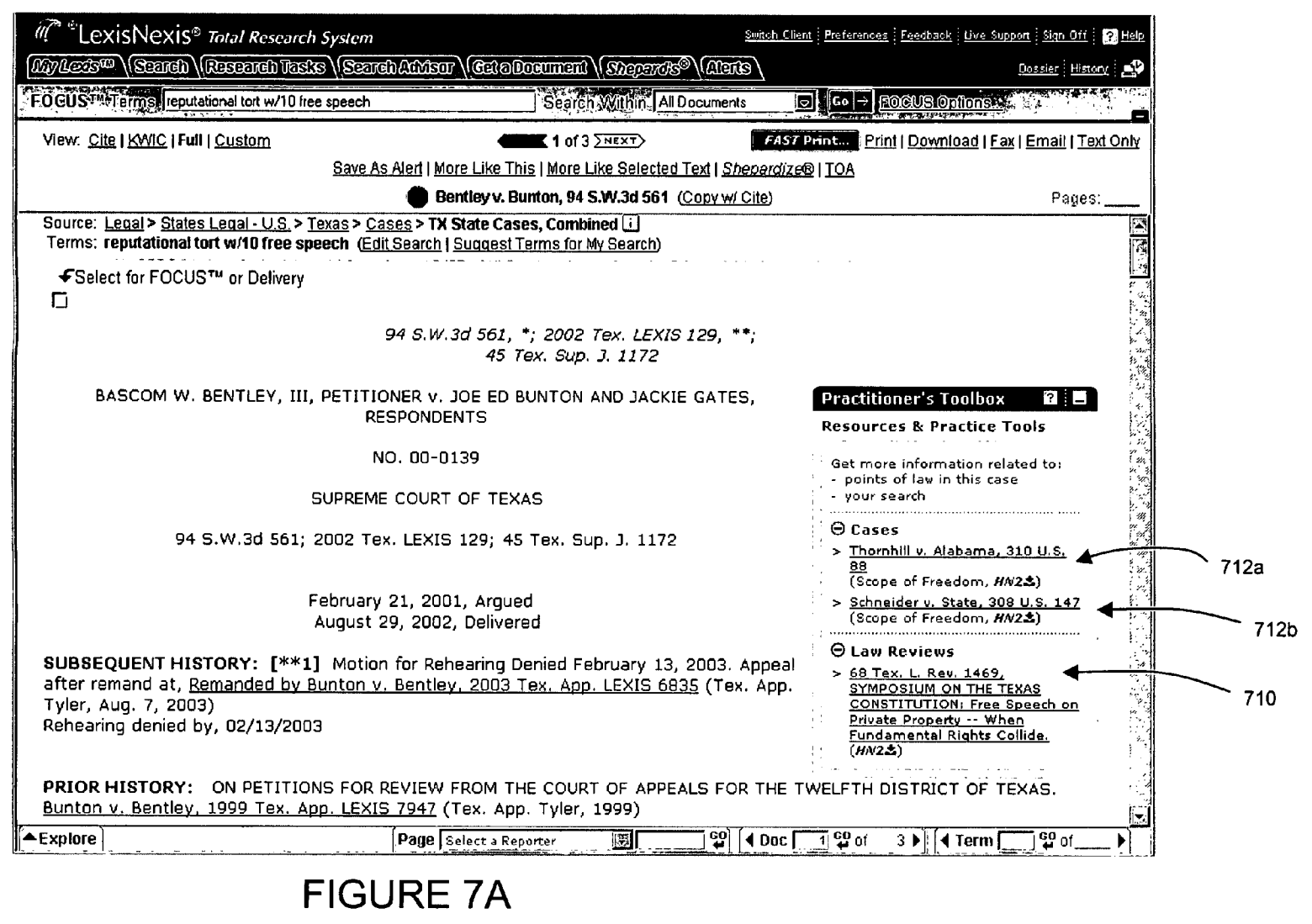

The system then processes the target document links associated with the selected headnote for each search. As shown in FIG. 6A, for the slander search, three treatise links 610a, 610b, and 610c are selected for display: 4-52 *Texas Torts and Remedies* §52.02, Elements of Defamation; 20-333 Dorsaneo, *Texas Litigation Guide* §333.201, Case Law; 11-46 *Personal Injury—Actions, Defenses, Damages* Supp. to 1.01(2), Definition and Basic Requirements; Nature of Defamation; "Defamation" Defined. As shown in FIG. 7A, for the reputational search, a single law review 710 is selected for display: 68 Tex. L. Rev. 1469, SYMPOSIUM ON THE TEXAS CONSTITUTION: Free Speech on Private Property—When Fundamental Rights Collide.

The system selects landmark cases based upon the Search Advisor topical classifications assigned to the selected headnotes. For the slander search, headnote 13 is classified with a Torts/Defamation Actions topic (reference number 620 in FIG. 6B, which has landmarks of *New York Times Co. v. Sullivan*, 376 U.S. 254; *Carr v. Brasher*, 776 S.W.2d 567; and *Gertz v. Robert Welch, Inc.*, 418 U.S. 323. For the reputational search, headnote 2 is classified with Constitutional Law/Defamation and Constitutional Law/Scope of Freedom (reference number 720 in FIG. 7B). No landmarks are found for the Defamation topic, but two cases 712a and 712b are displayed for the Scope of Freedom topic (FIG. 7A): *Thornhill v. Alabama*, 310 U.S. 88; and *Schneider v. State*, 308 U.S. 147.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

I claim:

1. A computer-implemented method for linking documents with multiple topics to related documents, implemented using a client/server network architecture, comprising:

in advance of a user search request, searching in a seed source to identify seed documents having at least one discrete seed topic but lacking target document links, using the client/server network architecture, each seed document belonging to one of a plurality of collections of seed documents, each collection having a target source map defining a list of target sources to search to generate target document links for seed documents belonging in the collection, wherein the at least one seed topic corresponds to a topical classification assigned from a taxonomy for a specific subject area, and wherein the at least one seed topic is pre-defined in advance of a user search request;

retrieving and formatting the identified seed documents, in advance of a user search request, using the client/server network architecture;

extracting the at least one seed topic for each retrieved seed document, in advance of a user search request, using the client/server network architecture;

for each retrieved seed document, retrieving the list of the target sources found in the target source map for the collection to which the seed document belongs, in advance of a user search request, using the client/server network architecture; and for each seed topic within each retrieved seed document, processing each target source within the list of target sources defined by the target source map for the collection to which the retrieved seed document belongs, to pre-establish a target document link for the seed topic using a natural language search constructed from the seed topic, in advance of a user search request, using the client/server network architecture.

2. The method of claim 1, further comprising the steps of:
in response to retrieval of a seed document as the result of a search request from a user, selecting seed topics of the retrieved seed document that are relevant to the search request, based on terms of the search request occurring within the seed topics, whereby the selection of the seed topics is dynamic; and displaying to the user those candidate target document links pre-established for the selected seed topics, whereby the displayed target document links are relevant to the retrieved seed document and to the search request resulting in retrieval of the retrieved seed document.

3. The method of claim 1, further comprising the step of preparing a source to be a target source by preparing documents in the source to be target documents in the target source, by assigning basic definitions to the target source, wherein the basic definitions include a definition of a portion of each of the target documents suitable as a description of the target document for purposes of displaying a link to a user, and a definition for generating a term vector for the target document, prior to the searching step.

4. The method of claim 3, wherein the step of preparing documents in a source includes the step of assigning basic definitions to the source.

5. The method of claim 1, wherein in the step of processing each target source, each target source within the list of target sources defined by the target source map for the retrieved seed document is processed for a document that qualifies for the current seed topic.

6. The method of claim 3, wherein each of the target documents in the target source has a citation, and wherein in the step of preparing documents in a source to be target documents, the basic definitions are implemented by a list of XML elements to retrieve for a display of a target document link in response to a user request and an XML element that specifies the citation for the target document.

7. The method of claim 6, wherein in the step of retrieving and formatting, the formatting includes extracting XML elements specific to seed topics of the identified seed documents, and wherein the step of processing each target source for each seed topic comprises the steps of:

constructing a special target document link search comprising a plurality of search terms, from the XML element for the seed topic;

running the special target document link search in a target source specified in the list of target sources;

returning target documents matching the special target document link search, from the specified target source;

performing a target document link retrieval request for each target document returned by the returning step;

in response to the target document link retrieval request, retrieving a requested target document;

loading the retrieved target document into an XML parser;

retrieving metadata for the retrieved target document based at least in part upon the target source;

storing the metadata in a data set;

generating core terms from the retrieved target document, based on the metadata;

locating and marking each of the search terms found within the retrieved target document;

comparing the found search terms within the retrieved target document with the core terms generated therefrom;

determining a score equal to the number of unique search terms that are also core terms;

generating an XML document containing all the data as defined within display of the target document link in response to the user request and the score;

comparing the scores returned for each retrieved target document;

retaining only those retrieved target documents meeting a pre-determined score threshold;

collecting all the retrieved target documents retained by the retaining step;

generating a new XML element containing the target document links; and adding the new XML element back into the original seed document.

8. The method of claim 7, wherein the step of retrieving a requested target document in response to the target document link retrieval request, returns a citation for any document retrieved from the target source that is sufficient to generate a hypertext link to that document.

9. The method of claim 8, wherein the step of retrieving a requested target document in response to the target document link retrieval request, further returns suitable text to display as a label for the hypertext link.

10. The method of claim 7, wherein in the step of storing the metadata, the data set is indexed by source and view.

11. The method of claim 7, wherein in the step of generating core terms, the core terms represent the statistically most important words and phrases within the retrieved target document.

12. The method of claim 7, wherein the step of generating an XML document is carried out by applying an XSLT style sheet to select only the required XML elements within the retrieved target document and place them in new XML elements as required by a retrieving application.

13. The method of claim 7, wherein in the retaining step, only as many documents as are specified in a separate configurable value are retained.

14. The method of claim 12, wherein if tie scores occur, the retrieved target document ranked higher by an initial search is retained.

15. The method of claim 1, further comprising the steps of:
creating a list of landmark documents;
storing in a table the landmark documents, data representing the names of the landmark documents, the primary citations for the landmark documents, and the frequency with which each of the landmark documents is cited by other documents; and creating a file containing the data in a format optimized for on-line retrieval.

16. The method of claim 1, wherein the step of processing each seed topic within each seed document to construct a target document link for each seed topic includes the steps of:
- in response to a target document link search carried out in a target source specified in the list of target sources, returning matching target documents from the specified target source;
- retaining only those matching target documents meeting pre-determined specifications;
- generating a new XML element containing target document links for the retained target documents; and
- adding the new XML element back into the original seed document.

17. The method of claim 16, further comprising the step of running multiple target document link searches for each extracted seed topic being processed.

18. The method of claim 7, further comprising the steps of:
- in response to retrieval of a seed document as the result of a search request by a user, selecting the seed topics within the seed document that are relevant to the search request based on terms of the search request occurring within the seed topics;
- following the step of selecting the seed topics, selecting target document links that have been fabricated for the selected seed topics;
- for each seed topic selected as relevant to the search that caused the seed document to be retrieved, scoring the selected target document links fabricated into the seed document for the selected topics;
- selecting a preset maximum number of selected target document links to be displayed as target document links, based on the type of publication of each target source;
- for each target document link selected for display, constructing a hypertext link using the data previously stored in the XML element associated with the target document link in the XML document; and
- organizing the hypertext links for display within the context of the seed document display.

19. The method of claim 18, wherein the step of selecting the seed topics comprises analyzing the search terms that occurred within the seed topics using traditional information retrieval techniques.

20. The method of claim 19, wherein the information retrieval techniques include at least one of term frequency, search term coverage, and seed topic length.

21. The method of claim 18, wherein in the scoring step, the score is generated based upon the number of unique search request terms within the target document that are also core terms of the selected target document link.

22. The method of claim 18, wherein in the step of selecting a preset maximum number of target document links, the selection is based upon the score assigned to the target document link and a business priority assigned to the target source.

23. The method of claim 22, wherein in the step of organizing the hypertext links for display, the hypertext links are organized by material type, and ordered within each material type by the assigned score and business priority.

24. The method of claim 18, wherein each hypertext link to the target document also contains a reference to the seed topic within the seed document for which the target document was selected.

25. The method of claim 24, wherein the reference to the seed topic is in the form of an intra-document link.

\* \* \* \* \*